United States Patent
Huttner et al.

(10) Patent No.: US 11,411,657 B2
(45) Date of Patent: Aug. 9, 2022

(54) QUANTUM COMMUNICATION SYSTEM

(71) Applicant: ID QUANTIQUE SA, Carouge (CH)

(72) Inventors: Bruno Huttner, Lausanne (CH); Anett Krammer, Lausanne (CH)

(73) Assignee: ID QUANTIQUE SA, Carouge (CH)

( * ) Notice: Subject to any disclaimer, the term of this patent is extended or adjusted under 35 U.S.C. 154(b) by 75 days.

(21) Appl. No.: 17/112,858

(22) Filed: Dec. 4, 2020

(65) Prior Publication Data
US 2021/0175978 A1 Jun. 10, 2021

(30) Foreign Application Priority Data
Dec. 6, 2019 (EP) .................................. 19214159

(51) Int. Cl.
*H04B 10/00* (2013.01)
*H04B 10/70* (2013.01)
(Continued)

(52) U.S. Cl.
CPC ............. *H04B 10/70* (2013.01); *H04B 10/11* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118; H04B 10/70
See application file for complete search history.

(56) References Cited

U.S. PATENT DOCUMENTS

| 5,307,410 A | 4/1994 | Bennett | |
| 2004/0208598 A1* | 10/2004 | Wittenberger | H04B 10/1125 398/130 |

(Continued)

FOREIGN PATENT DOCUMENTS

EP 3337063 A1 6/2018

OTHER PUBLICATIONS

Miao Er-Long, Background noise of satellite-to-ground quantum key distribution, New Journal of Physics 7 (2005) 215 Published Oct. 10, 2005.

(Continued)

*Primary Examiner* — Daniel G Dobson
(74) *Attorney, Agent, or Firm* — Thomas Coester Intellectual Property

(57) ABSTRACT

The present relates to a quantum communication system for free space quantum key distribution. An emitter and a receiver, the emitter and the receiver are two points distanced by a free space quantum communication channel, the emitter being designed for wirelessly transmitting data to the receiver via said free space optical communication channel. The receiver includes an optical device capable of receiving the data within a predetermined field of view extending from said optical device toward the receiver. The system is characterized in that the emitter further comprises a light protecting device attached on said emitter. The light protecting device is configured to prevent any light coming from the environment beyond the emitter to enter within the field of view of the receiver. The invention further relates to a method for optimizing free space quantum key distribution.

15 Claims, 2 Drawing Sheets

(51) Int. Cl.
  *H04B 10/11* (2013.01)
  *H04J 14/00* (2006.01)

(56) References Cited

U.S. PATENT DOCUMENTS

2017/0118064 A1   4/2017   Medina
2019/0007137 A1*  1/2019   Djordjevic .............. H04L 63/08

OTHER PUBLICATIONS

Charles H Bennett, Quantum Cryptography Using Any Two Nonorthogonal States, Physical Review Letters, vol. 68, No. 21, May 25, 1992.
Martini M etal: 11 Laser ranging 1-15 positioning metrology for Galileo and the Moon 11, 2015 IEEE Metrology for Aerospace (Metroaerospace), IEEE, Jun. 4, 2015 (Jun. 4, 2015), pp. 77-81.
Sheikh Muhammad Set Al: "Challenges in establishing free space optical communications between flying vehicles", Communication Systems, Networks and Digital Signal Processing, 2008. CNSDSP 2008. 6th International Symposium on, IEEE, Piscataway, NJ, USA, Jul. 25, 2008 (Jul. 25, 2008), pp. 82-86.
Miao Er-Long Et Al: 11 Background noise of satellite-to-ground quantum key distribution; Background noise of satellite-to-ground quantum key distribution 11, New Journal of Physics, Institute of Physics Publishing, Bristol, GB, vol. 7, No. 1, Oct. 1, 2005 (Oct. 1, 2005), pp. 215-215.

* cited by examiner

QUANTUM COMMUNICATION SYSTEM

TECHNICAL FIELD

The present invention relates to a quantum communication system for free space quantum key distribution. The invention also concerns a method for optimizing free space quantum key distribution.

BACKGROUND OF THE ART

Quantum cryptography or quantum key distribution, in the following also referred to as QKD, is a method allowing the distribution of a secret key between two distant parties, the emitter and the receiver, with a provable security. Quantum key distribution relies on quantum physics principles and encoding information in quantum states, or qubits, as opposed to classical communication's use of bits. Usually, photons are used for these quantum states. Quantum key distribution exploits certain properties of these quantum states to ensure its security.

More particularly, the security of this method comes from the fact that the measurement of a quantum state of an unknown quantum system modifies the system itself. In other words, a spy eavesdropping on a quantum communication channel cannot get information on the key without introducing errors in the key exchanged between the emitter and the receiver thereby informing the user of an eavesdropping attempt.

The encryption devices enable secure transmission of useful payload by performing of symmetric encryption using the keys exchanged by quantum key distribution. Specific quantum key distribution systems are described for instance in U.S. Pat. No. 5,307,410, and in the article by C. H. Bennett entitled "Quantum cryptography using any two non-orthogonal states", Phys. Rev. Lett. 68, 3121 (1992).

One of the most restrictive limitations of ground QKD is the distance limitation. Due to unavoidable loss in the optical waveguide and the fact that optical amplifiers cannot be used in a quantum channel, the distance between Alice and Bob is limited to about hundred kilometers in a commercial setup and up to four hundred kilometers in an academic experiment.

In order to increase the distance range further, the solution is to rely on Free-Space Optical communication (FSO) QKD, where the quantum channel is in free space, which does not have the same loss limitation as optical fibers.

For QKD through space, both for satellites, aircrafts and free space between ground terminals, one of the limitations is background noise. This background noise comes from two different sources: one is scattered ambient light, the second is from direct light coming from behind the emitter. Scattered light is the strongest during daytime, while direct light from stars and planets is the strongest during night time.

Various approaches have been reported to reduce background noise, for instance by spatial, temporal and wavelength filtering as described in document Miao Er-Long et al., New Journal of Physics 7 (2005), 215.

However, when it comes to minimizing background noise in particular direct light, the existing technologies do not provide satisfying solutions notably because both scattered light from ambient light and some direct light from behind or beyond the emitter always remain. Moreover, current techniques mainly focus on the removal of the scattered background while being inefficient against direct background light.

Therefore, there is a need for an improved system capable of removing or minimizing the major source of background noise in free space in night time and day time, in particular in night time.

SUMMARY OF THE INVENTION

The above problems are solved, at least partially, by the system and the method according to present invention.

The invention concerns Quantum communication system for free space quantum key distribution comprising
an emitter and a receiver, the emitter and the receiver being two points distanced by a free space quantum communication channel, the emitter being designed for wirelessly transmitting data to the receiver via said free space communication optical channel,
the receiver comprising an optical device capable of receiving the data within a predetermined field of view extending from said optical device toward the emitter,
the system being characterized in that the emitter further comprises a light protecting device attached on said emitter,
said light protecting device being configured to prevent any light coming from the environment beyond the emitter to enter within the field of view of said receiver.

In the Quantum communication system according to the present invention, a light protecting device is attached on the emitter and acts as a barrier to block any direct light coming from beyond the emitter. The term "beyond the emitter" refers to an area mainly located around the side of the emitter that is not facing the receiver, and that it is, at least partly, within the field of view of the receiver.

The light protection device acts as a shield or physical barrier to block light coming from beyond the emitter and prevent it from entering the receiver.

Advantageously, the present invention strongly reduces the direct background noise at the receiver, thus improving signal to noise ratio. It will be applicable during night time and day time, preferably during night time.

Advantageously, the present invention offers a solution against eavesdropping scenarios for instance where the eavesdropper sends light from behind the emitter to control the receiver.

Preferably, the dimensions of said light protecting device are chosen so as to match or exceed the dimensions of field of view of the receiver. Typically, for a satellite-based system, the field of view of said receiver (on the ground) is 10 micro-radians ($10^{-5}$ radians), which lead to a diameter of 10 m for the light protecting device on the satellite at a distance of 1000 km from the ground.

In one embodiment, the emitter is either a fixed point or a mobile point, while the receiver is a fixed point. Preferably the receiver is a fixed point and the emitter is mobile point. Alternatively, the receiver is a fixed point and the emitter is fixed point relative to the emitter.

Preferably, the receiver is a ground-based terminal and the emitter is a mobile point, which can be either an aircraft, a high altitude platform or another flying object, or a satellite. Alternatively, for ground-to-ground free-space communication, the receiver is a ground based receiver and the emitter is another ground-based terminal relative to the emitter.

In an embodiment, the emitter is a satellite and the receiver is a ground-based terminal, the light protection device on the emitter is configured to prevent light from stars, planets and/or any object beyond the emitter to enter within the field of view of the receiver.

In another embodiment, both emitter and receiver are ground-based terminals. Typically, the receiver is a fixed terminal. The emitter can be either a fixed terminal, or a mobile terminal, on a vehicle. In this case, due to atmospheric absorption, the distance between emitter and receiver is limited to typically 10 km. The field of view of the receiver can be 0.1 milliradians ($10^{-4}$ radians), which lead to a diameter of 1 m for a protecting device 10 km away.

In one embodiment, the system further comprises means for real time adjustment of the position of the light protecting device with respect to the position of the receiver to ensure the light protecting device prevents any light coming from the environment beyond the emitter to enter within the field of view of the receiver.

In an embodiment, the light protecting device is arranged for significantly removing the background noise in day time and/or in night time, preferably night time.

In one embodiment, the light protection device is arranged for protecting the receiver from eavesdropping.

In an embodiment, the light protection device is a, possibly deployable or inflatable, umbrella shaped device or a deployable gossamer-sail like device or deorbit sail like device attached to the emitter by attachment means. For instance, when the emitter is a satellite, for instance at a distance of 1000 km of the receiver, the light protecting device has the following dimensions: 10 m diameter. When the emitter is a flying object or ground-based, for instance at a distance of 10 km of the receiver, the light protecting device has a diameter of 1 m.

In one embodiment, the light protecting device comprises an opaque material.

In an embodiment, the optical device on the receiver is a telescope

The invention also concerns a method for optimizing free space quantum key distribution, the method comprising:
i) Providing an emitter and a receiver, the emitter and the receiver being two points distanced by a free space quantum communication channel, the emitter being designed for wirelessly transmitting data to the receiver via said free space optical communication channel, the receiver comprising an optical device capable of receiving the data within a predetermined field of view extending from said optical device toward the receiver
ii) Attaching a light protecting device on the emitter, said light protecting device being configured to prevent any light coming from the environment beyond the emitter to enter within the field of view of the receiver.

The particular advantages of the methods are similar to the ones of the device of the invention and will thus not be repeated here.

In one embodiment, the method further comprises before the attachment step:
iii) determining the dimensions of a light protection device attached to the emitter so as to match or exceed the dimensions of field of view.

In an embodiment, the method further comprises:
Real-time adjustment of the position of the light protecting device with respect to the position of the receiver to ensure the light protecting device prevents any light coming from the environment beyond the emitter to enter within the field of view of the receiver.

The claimed invention can comprise one embodiment or a combination of several embodiments.

The embodiments described for the system also apply to the methods according to the present invention mutatis mutandis.

The embodiments described for the method also apply to the system according to the present invention mutatis mutandis.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 1:
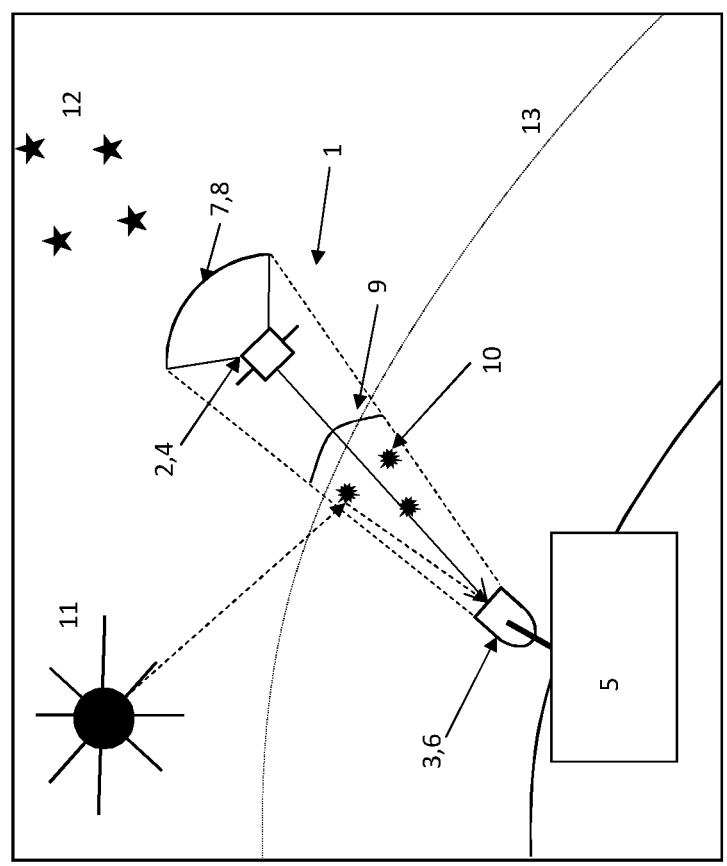
FIG. 1 represents a first embodiment of the present invention.

FIG. 1 represents a first embodiment of the quantum communication system 1 of the present invention.

The system 1 is a QKD system that allows free space quantum key distribution between an emitter 2 and a receiver 3. In the present embodiment, the emitter 2 is a satellite 4 beyond the lower atmosphere 13 and the receiver 3 is a ground-based terminal 5.

It should be noted that within the lower atmosphere 13, the light can be scattered by the scattering means 10, such as molecules and/or atoms, present in the lower atmosphere 13. Otherwise, beyond the lower atmosphere 13, the scattering means 10 are negligible, i.e. very low atmospheric density, and the scattered light is negligible. The satellite 4 is designed for wirelessly transmitting data to the ground-based terminal 5 via a free space optical communication channel.

The ground-based terminal 5 comprises a telescope 6 for receiving the data emitted by the satellite 4. The telescope is capable of receiving data within a field of view 9.

A light protecting device 7 is mounted on the satellite 4. In the present embodiment, the light protecting device 7 is an umbrella 8 with a concave shaped with the curvature pointing towards the telescope 6.

The umbrella is made with an opaque material.

Figure 2:
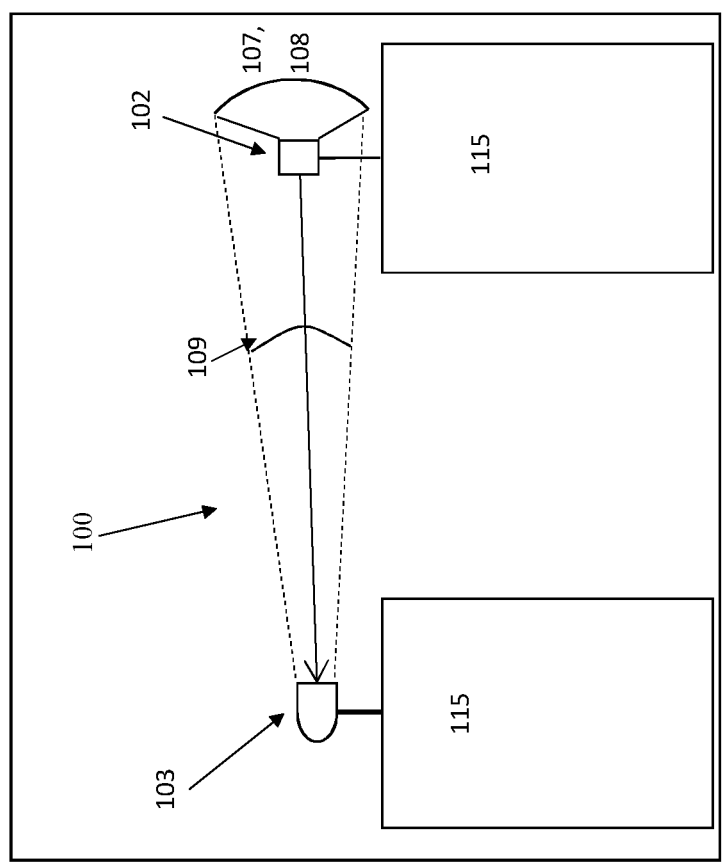
FIG. 2 represents a second embodiment of the invention.

FIG. 2 represents a system 100 according to a another embodiment of the invention with a ground-to-ground link, wherein the emitter 102 and the receiver 103 are ground-based equipments. The emitter 102 is an antenna installed on a building 115 and the receiver 103 is installed on another building opposite the building of the emitter 102.

In this case, the light protecting device 107 is an umbrella 108 that protects against attacks coming from behind the emitter 102. Consequently, this provide a solution against eavesdropping scenarios where the eavesdropper sends light from behind the emitter to control the receiver.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different apparatuses which can be used.

REFERENCE NUMBERS

1 Quantum communication system according to a first embodiment
2 Emitter
3 Receiver
4 Satellite
5 Ground based terminal
6 Telescope
7 Light protecting device
8 Umbrella
9 Field of view
10 Scattering medium
11 Sun
12 Stars and/or planets
13 Lower atmosphere
100 Quantum communication system according to a second embodiment
102 Emitter
103 Receiver
107 Light protecting device
108 Umbrella
109 Field of view
115 Building

The invention claimed is:

1. Quantum communication system (1,100) for free space quantum key distribution comprising
an emitter (2,102) and a receiver (3,103), the emitter (2,102) and the receiver (3,103) being two points distanced by a free space quantum communication channel, the emitter (2,102) being designed for wirelessly transmitting data to the receiver (3,103) via said free space optical communication channel,
the receiver (3,103) comprising an optical device (6) capable of receiving the data within a predetermined field of view (9,109) extending from said optical device (6) toward the receiver (3,103),
the system (1,100) being characterized in that the emitter (2,102) further comprises a light protecting device (7,107) attached on said emitter (2,102),
said light protecting device (7.107) being configured to prevent any light coming from the environment beyond the emitter (2,102) to enter within the field of view (9,109) of the receiver (3,103).

2. Quantum communication system (1,100) according to claim 1, wherein the dimensions of said light protecting device (7,107) are chosen so as to match or exceed the dimensions of field of view (9,109).

3. Quantum communication system (1,100) according to claim 1, wherein the emitter (2,102) is either a fixed point or a mobile point, ground-based terminal (5,105) or a satellite (4,104), or the receiver (3,103) is either a fixed point or a mobile point, preferably the receiver (3,103) is a fixed point and the emitter (2,102) is mobile point.

4. Quantum communication system (1,100) according to claim 1 wherein the fixed point is a ground-based terminal (5,105) and the mobile point is a satellite (4,104).

5. Quantum communication system (1,100) according to claim 1, wherein the emitter (2,102) and the receiver (3,103) are both ground-based terminals (5,105).

6. Quantum communication system (1,100) according to claim 1, wherein the emitter (2,102) is a satellite (4,104) and the receiver (3,103) is a ground-based terminal (5,105), the light protection device (7,107) is configured to prevent light from stars, planet, or any other light emitting object to enter within the field of view (9,109) of the receiver (3,103).

7. Quantum communication system (1,100) according to claim 1, wherein the system (1,100) further comprises means for real time adjustment of the position of the light protecting device (7,107) with respect to the position of the receiver (3,103) to ensure the light protecting device (7,107) prevents any light coming from the environment beyond the emitter (2,102) to enter within the field of view (9,109) between the emitter (2,102) and the receiver (3,103).

8. Quantum communication system (1,100) according to claim 1, wherein the light protection device (7,107) is arranged for significantly removing the background noise in day time and/or in night time, preferably night time.

9. Quantum communication system (1,100) according to claim 1, wherein the light protection device (7,107) is arranged for protecting the receiver (3,103) from eavesdropping.

10. Quantum communication system (1,100) according to claim 1, wherein the light protection device (7,107) is a, possibly deployable or inflatable, umbrella shaped device (8,108) or a deployable gossamer-sail like device or deorbit sail like device attached to the emitter by attachment means.

11. Quantum communication system (1,100) according to claim 1, wherein the light protection device (8,108) comprises an opaque material.

12. Quantum communication system (1,100) according to claim 1, wherein the optical device is a telescope (6).

13. Method for optimizing free space quantum key distribution, the method comprising:
i) Providing an emitter (2,102) and a receiver (3,103), the emitter (2,102) and the receiver (3,103) being two points distanced by a free space quantum communication channel, the emitter (2,102) being designed for wirelessly transmitting data to the receiver (3,103) via said free space optical communication channel, the receiver (3,103) comprising an optical device capable of receiving the data within a predetermined field of view (9,109) extending from said optical device toward the receiver (3,103);
ii) Attaching a light protecting device (7,107) on the emitter, said light protecting device being configured to prevent any light coming from the environment beyond the emitter (2,102) to enter within the field of view (9,109) of the receiver (3,103).

14. Method according to claim 13, wherein the method further comprises before the attachment step:
iii) determining the dimensions of a light protection device (7,107) attached to the emitter (2,102) so as to match or exceed the dimensions of the field of view (9,109).

15. Method according to claim 13, wherein the method further comprises:
Real-time adjustment of the position of the light protecting device (7,107) with respect to the position of the receiver (3,103) to ensure the light protecting device (7,107) prevents any light coming from the environment beyond the emitter (2,102) to enter within the field of view (9,109) of the receiver (3,103).

* * * * *